United States Patent
Tang et al.

(10) Patent No.: US 10,952,138 B2
(45) Date of Patent: Mar. 16, 2021

(54) MACHINE TYPE COMMUNICATION METHOD, TERMINAL, AND BASE STATION

(71) Applicant: GUANGDONG OPPO MOBILE TELECOMMUNICATIONS CORP., LTD., Guangdong (CN)

(72) Inventors: Hai Tang, Dongguan (CN); Yuanqing Zeng, Dongguan (CN)

(73) Assignee: GUANGONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/565,893

(22) Filed: Sep. 10, 2019

(65) Prior Publication Data

US 2020/0008145 A1   Jan. 2, 2020

Related U.S. Application Data

(63) Continuation of application No. 15/573,140, filed as application No. PCT/CN2016/080338 on Apr. 27, 2016, now Pat. No. 10,455,498.

(30) Foreign Application Priority Data

May 29, 2015 (CN) .......................... 201510290760.5

(51) Int. Cl.
*H04W 52/02* (2009.01)
*H04W 8/04* (2009.01)
(Continued)

(52) U.S. Cl.
CPC ......... *H04W 52/0209* (2013.01); *H04L 43/10* (2013.01); *H04W 4/70* (2018.02);
(Continued)

(58) Field of Classification Search
CPC ...... H04W 52/0209; H04W 4/70; H04W 8/04
See application file for complete search history.

(56) References Cited

U.S. PATENT DOCUMENTS 6,580,909 B1 * 6/2003 Carro .................... H04W 60/00
455/435.1
2011/0128911 A1   6/2011 Shaheen
(Continued)

FOREIGN PATENT DOCUMENTS

CN  102378211 A   3/2012
CN  1102668493 A   9/2012
(Continued)

OTHER PUBLICATIONS

First Office Action of the Japanese application No. 2017-560904, dated Nov. 22, 2019.
(Continued)

*Primary Examiner* — Fahmida S Chowdhury

(57) ABSTRACT

An embodiment provides a Machine Type Communication (MTC) method, which includes that: a terminal receives a polling instruction from a base station; the terminal performs registration on a first access resource indicated by the polling instruction; and the terminal sends registration information to the base station. In the embodiment, the terminal completes registration according to the polling instruction sent by the base station. Such a process is simple and consistent, which can reduce complexity and power consumption of MTC, and can further reduce the deployment cost of an MTC system and prolong the service life of battery-powered equipment.

23 Claims, 5 Drawing Sheets

(51) Int. Cl.
*H04W 4/70* (2018.01)
*H04L 12/26* (2006.01)
*H04W 24/10* (2009.01)
*H04W 60/00* (2009.01)
*H04W 88/02* (2009.01)
*H04W 88/08* (2009.01)

(52) U.S. Cl.
CPC ............. *H04W 8/04* (2013.01); *H04W 24/10* (2013.01); *H04W 52/02* (2013.01); *H04W 60/00* (2013.01); *H04W 88/02* (2013.01); *H04W 88/08* (2013.01); *Y02D 30/70* (2020.08)

(56) References Cited

U.S. PATENT DOCUMENTS

| | | | |
|---|---|---|---|
| 2011/0274040 A1* | 11/2011 | Pani | H04W 74/006 370/328 |
| 2012/0004003 A1* | 1/2012 | Shaheen | H04L 61/2069 455/509 |
| 2012/0030358 A1 | 2/2012 | Mackenzie | |
| 2012/0155406 A1 | 6/2012 | Kyung | |
| 2012/0202508 A1 | 8/2012 | Toth | |
| 2012/0231828 A1 | 9/2012 | Wang | |
| 2014/0269283 A1 | 9/2014 | Shaheen | |
| 2015/0023244 A1 | 1/2015 | Shaheen et al. | |
| 2015/0038153 A1 | 2/2015 | Toth et al. | |
| 2015/0163831 A1 | 6/2015 | Wang et al. | |
| 2016/0007139 A1 | 1/2016 | MacKenzie | |
| 2016/0081074 A1* | 3/2016 | Muramoto | H04W 52/0277 370/392 |
| 2016/0150573 A1 | 5/2016 | Pani et al. | |
| 2017/0150294 A1 | 5/2017 | Wang et al. | |

FOREIGN PATENT DOCUMENTS

| | | |
|---|---|---|
| CN | 102771174 A | 11/2012 |
| CN | 102804882 A | 11/2012 |
| CN | 103209384 A | 7/2013 |
| CN | 103260251 A | 8/2013 |
| CN | 103828469 A | 5/2014 |
| CN | 103945497 A | 7/2014 |
| CN | 103999524 A | 8/2014 |
| CN | 104936132 A | 9/2015 |
| CN | 104936133 A | 9/2015 |
| EP | 2504971 A1 | 10/2012 |
| JP | 2007184754 | 7/2007 |
| JP | 2014209777 A | 11/2014 |
| KR | 20130069891 A | 6/2013 |
| WO | 2011087826 A1 | 7/2011 |
| WO | 2011100596 A2 | 8/2011 |

OTHER PUBLICATIONS

International Search Report in the international application No. PCT/CN2016/080338, dated Aug. 2, 2016.
English translation of the Written Opinion of the International Search Authority in the international application No. PCT/CN2016/080338, dated Aug. 2, 2016.
Supplementary European Search Report in the European application No. 16802414.9, dated Sep. 21, 2018.
First Office Action of the Chinese application No. 201510290760.5, dated Nov. 16, 2017.
Research on congestion avoidance for random access in M2M of LTE System, dated Dec. 15, 2013.
Third Office Action of the Chinese application No. 201510290760.5, dated Jan. 11, 2019.
Office Action of the Indian application No. 201717044500, dated Jun. 3, 2020.

* cited by examiner

MACHINE TYPE COMMUNICATION METHOD, TERMINAL, AND BASE STATION

This application is a continuation of U.S. application Ser. No. 15/573,140, filed on Nov. 10, 2017, which is a national phase application of International Patent Application No. PCT/CN2016/080338, filed on Apr. 27, 2016, which claims benefit of Chinese Application No. 201S10290760.5, filed on May 29, 2015 and named after "Machine Type Communication (MTC) method, terminal and base station", the contents of which are hereby incorporated by reference in their entireties.

TECHNICAL FIELD

Embodiments of the present disclosure relate to the field of communications, and in particular to an MTC method, a terminal and a base station.

BACKGROUND

A conventional mobile communication network is mainly for human-to-human voice communication. The introduction of MTC may cause relatively great influence on the conventional mobile communication network. Therefore, besides supporting conventional voice data communication with human service objects, a next-generation mobile communication network (which may be called as 5th-Generation (5G)) further includes MTC applications in various scenarios, such as various kinds of intelligent monitoring of industry, agriculture, intelligent transportation, smart home, intelligent meter reading, earthquake, tsunami and fire monitoring and the like.

MTC is applied on a large scale to application scenarios quite different from a conventional mobile communication system, so that a series of new requirements on a wireless communication technology are made. For example, monitoring sensor type equipment which is deployed on a large scale and mostly powered by batteries has the characteristics of low cost, low power consumption, long-period small data packet transmission, delay insensitivity and the like; while a machine applied to industrial production, the Internet of vehicles, intelligent transportation and the like requires an extremely short delay, high reliability and high availability to ensure normal running. These new characteristics require a 5G system to adopt a series of new technologies.

An existing machine communication terminal which transmits data by virtue of a wireless technology may usually use a dedicated technology or a mature 2nd/3rd/4th-Generation (2/3/4G) communication module. It is difficult for a module using a dedicated technology to gain scale benefits.

Part of technologies try to make improvements on the basis of a 4G mobile communication technology. For example, machine communication devices are grouped for resource sharing. However, these technical solutions still have shortcomings, such as complex flow, reduction in system deployment flexibility, high battery life reduction rate caused by increase of power consumption of part of terminals and relatively more occupied Internet Protocol (IP) and wireless system resources.

It can be seen that large-scale MTC cannot be realized by a 2/3/4G mobile communication technology in terms of complexity, power consumption and the like because large-scale MTC is not considered in the early stage of designing.

SUMMARY

Embodiments of the present disclosure provide an MTC method, a terminal and a base station, which may reduce complexity and power consumption of MTC.

According to a first aspect of the present disclosure, there is provided an MTC method, which may include:
receiving, by a terminal, a polling instruction from a base station;
performing, by the terminal, registration on a first access resource indicated by the polling instruction; and
sending, by the terminal, registration information to the base station.

According to a second aspect of the present disclosure, there is provided an MTC method, which may include:
sending, by a base station, a polling instruction to a terminal to enable the terminal to perform registration on a first access resource indicated by the polling instruction; and
receiving, by the base station, registration information from the terminal.

According to a third aspect of the present disclosure, there is provided a terminal, which may include:
a receiving unit, arranged to receive a polling instruction from a base station;
a processing unit, arranged to perform registration on a first access resource indicated by the polling instruction received by the receiving unit; and
a sending unit, arranged to send registration information to the base station.

According to a fourth aspect of the present disclosure, there is provided a base station, which may include:
a sending unit, arranged to send a polling instruction to a terminal to enable the terminal to perform registration on a first access resource indicated by the polling instruction; and
a receiving unit, arranged to receive registration information from the terminal.

According to a fifth aspect of the present disclosure, there is provided a terminal, which may include:
a receiver, arranged to receive a polling instruction from a base station;
a processer, arranged to perform registration on a first access resource indicated by the polling instruction received by the receiver; and
a sender, arranged to send registration information to the base station.

According to a sixth aspect of the present disclosure, there is provided a base station, which may include:
a sender, arranged to send a polling instruction to a terminal to enable the terminal to perform registration on a first access resource indicated by the polling instruction; and
a receiver, arranged to receive registration information from the terminal.

In the embodiments of the present disclosure, the terminal completes registration according to a polling instruction sent by the base station. Such a process is simple and consistent, which can reduce complexity and power consumption of MTC, and can further reduce the deployment cost of an MTC system and prolong the service life of battery-powered equipment.

BRIEF DESCRIPTION OF DRAWINGS

In order to describe the technical solutions in the embodiments of the present disclosure more clearly, the drawings to be used for descriptions about the embodiments or a conventional art will be simply introduced below. Obviously, the drawings described below are only some embodiments of the present disclosure. Those skilled in the art may further obtain other drawings according to these drawings without creative work.

DETAILED DESCRIPTION

The technical solutions in the embodiments of the present disclosure will be clearly and completely described below with reference to the drawings in the embodiments of the present disclosure. Obviously, the described embodiments are not all embodiments but part of embodiments of the present disclosure. All other embodiments obtained on the basis of the embodiments in the present disclosure by those skilled in the art without creative work shall fall within the scope of protection of the present disclosure.

It is to be noted that MTC in the embodiments of the present disclosure may also be called as Machine to Machine (M2M) communication. However, it will also be appreciated that MTC not only includes inter-machine communication, but also includes human-computer interaction communication.

It is to be noted that a base station in the embodiments of the present disclosure may be any equipment with a base station function, which for example, may be a NodeB in a 3G mobile communication system, an Evolutional Node B (eNB or eNodeB) in Long Term Evolution (LTE) of a 4G mobile communication system, or a node with the base station function in future 5G, which will not be limited in the present disclosure.

It is to be noted that a terminal in the embodiments of the present disclosure refers to an MTC terminal, which may also be called as an MTC device. For example, the MTC terminal may be a smart phone, an intelligent electric meter, or intelligent wearable equipment, which will not be limited in the present disclosure.

Figure 1:
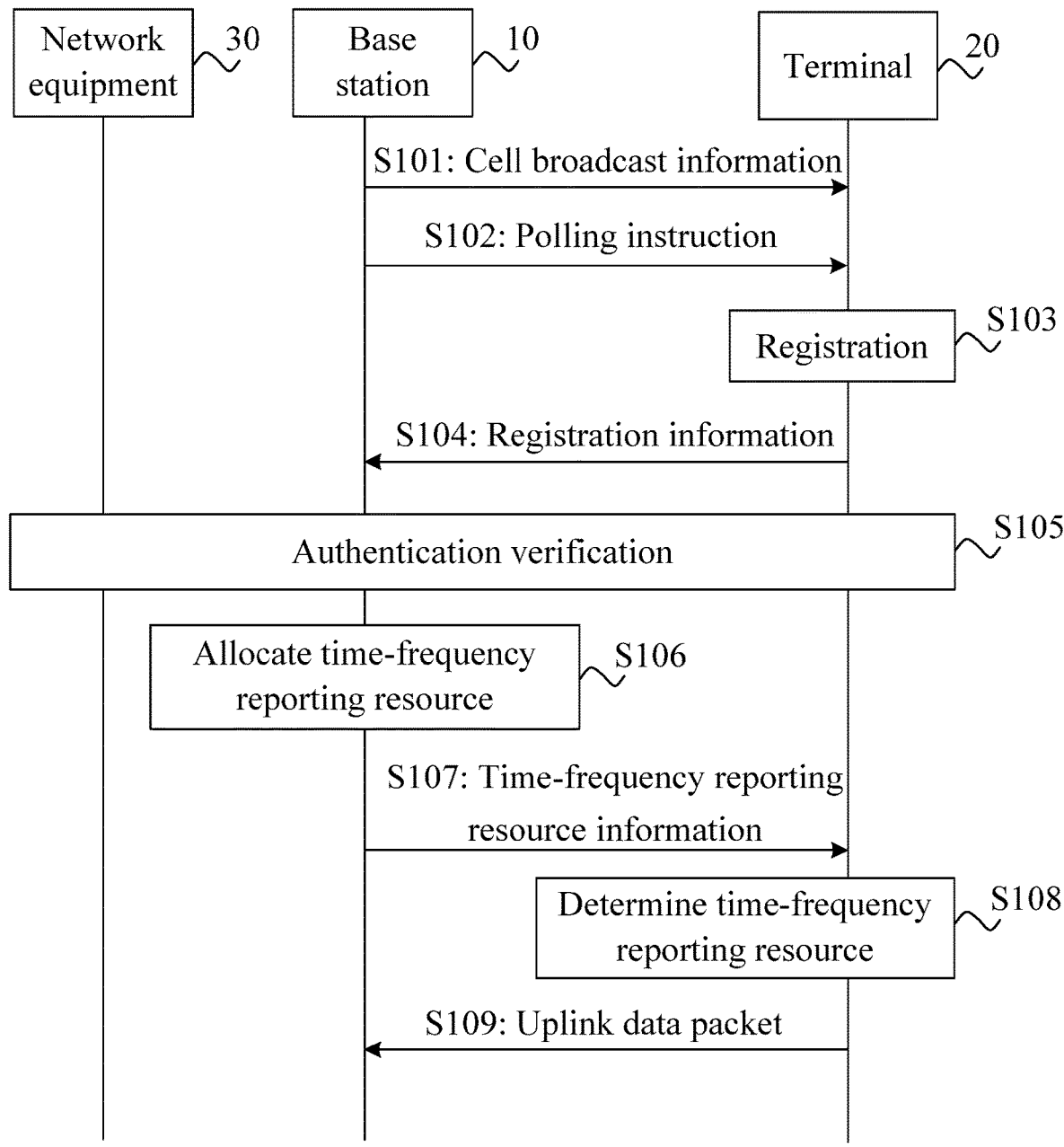
FIG. 1 is a flowchart of an MTC method according to an embodiment of the present disclosure.

FIG. 1 is a flowchart of an MTC method according to an embodiment of the present disclosure. In FIG. 1, a base station 10, a terminal 20 and network equipment 30 are shown. The network equipment 30 may be any one of: a wireless access network, a subscriber identity data server (such as a subscriber Home Location Register (HLR)), an authentication server and an MTC service subscription server. The method shown in FIG. 1 includes the following processes.

In S101, the base station 10 sends cell broadcast information through broadcast.

Specifically, the base station 10 may periodically broadcast the cell broadcast information. Specifically, the cell broadcast information may include a basic parameter of a cell. The basic parameter of the cell may include at least one of: a cell Identification (ID), a cell frequency point, a cell frequency bandwidth, an antenna amount, a cell transmission environment type, a cell resource utilization rate, transmitted power of the base station and a System Frame Number (SFN) at a broadcast time of the cell broadcast information.

Here, the cell transmission environment type may be one of: indoor, dense urban, urban, sub-urban and rural.

Here, system frames may have same or different time lengths. For example, under the condition that the system frames have different time lengths, system information in an (R−i)th (i=1,2, . . . , R−1) system frame may be used to indicate a length of an Rth system frame. Moreover, the information may be broadcast for once to i−1 times in system frames numbered to be from R−i to R−1 to ensure reliable reception of the terminal.

Optionally, the cell broadcast information may also include multiple weights (which may also be called as weighted coefficients). The multiple weights correspond to multiple judgment bases one to one, and the judgment bases are the grounds for the terminal 20 to judge whether to initiate registration or not. Here, the multiple weights may be determined by the base station 10 according to an MTC service characteristic, system resource usage and other factors. Specifically, Please refer to related descriptions in subsequent S103 for the weights and judgment of the terminal 20 about whether to initiate registration or not.

Moreover, the cell broadcast information may be broadcast and from the base station 10 on a dedicated frequency where no data is born by adopting transmitted power not lower than preset transmitted power. Here, the dedicated frequency may be a relatively lower frequency band where no data is born, for example, lower than a lowest frequency used for an existing 2/3/4G system. Here, the preset transmitted power may be maximum transmitted power used for a macro base station in the existing 2/3/4G system. In such a manner, deep coverage (an indoor scenario may be included) may be implemented, cell (with relatively smaller coverage) radio resources actually bearing data businesses may be saved, and moreover, multiple cells can be coordinated directly.

Here, the cell broadcast information may also be sent by a macro base station or a central/regional system scheduler and the like within a relatively larger region including multiple communication base stations, which will not be limited in the present disclosure.

Or, it is appreciated that the cell broadcast information may also be sent by the base station 10 by adopting preset transmitted power on a frequency which is preset by an operating company. For example, the preset frequency is 150 Mhz, and the preset transmitted power is 25W. There are no limits made in the present disclosure.

In such a manner, a terminal located in a cell where the base station 10 is located can receive the cell broadcast information. Even a terminal located outside the cell where the base station 10 is located can also receive the cell broadcast information. Specifically, the terminal 20 searches for cell broadcast information after being started, and moreover, the terminal 20 may receive cell broadcast information from multiple base stations respectively. Furthermore, the terminal 20 may correctly receive a subsequent message according to the received cell broadcast information.

In addition, the cell broadcast information may include a sending location of a polling instruction, so that the terminal 20 may subsequently receive the polling instruction at the sending location.

In S102, the base station sends a polling instruction.

Specifically, the base station may periodically or non-periodically send the polling instruction through broadcast.

Moreover, the polling instruction may be determined by the base station 10 according to factors such as cell resource utilization, an MTC service requirement and the like, wherein the cell resource utilization may include a cell payload, cell access resource utilization and the like.

It is appreciated that the terminal 20 receives the polling instruction at the sending location in S102 if the cell broadcast information in S101 includes the sending location of the polling instruction.

Here, the polling instruction may indicate multiple access resources for an unregistered terminal to use. Here, the access resources, which may also be called as time-frequency registration resources or registration windows, refer to registration windows which are allocated by the base station 10 and may be used for the unregistered terminal. It is appreciated that locations of the registration windows are locations of the access resources.

Specific locations of the registration windows and the number and types of the radio resources usable for registration of the terminal in the registration windows are indicated by the polling instruction. The access resources may also be called as slots, and the base station 10 may allocate slots with different sizes according to a distance between the terminal and the base station, a wireless signal transmission path loss and the like. The sizes of the slots may be regulated in terms of time and/or frequency.

Each access resource in the multiple access resources may include location information and serial number information. Specifically, the base station 10 may number the access resources according to types. For example, relatively larger ones are called as long access resources (which may also be called as long slots), and normal access resources are called as normal access resources (which may also be called as normal slots). That is, the multiple access resources include multiple long access resources and multiple normal access resources. Moreover, the access resources indicated by the polling instruction may be numbered in the following manner: long slot: 1 . . . L, and normal slot: 1 . . . N, wherein L represents the number of the long access resources, and N represents the number of the normal access resources.

In addition, the location information and serial number information of the access resources may have a corresponding relationship. For example, locations and numbers are associated in a certain manner. For example, they are adjacent or spaced on frequency at the same time point; or they are continuous or spaced on time on the same frequency; or they are two dimensionally distributed on time/frequency in, for example, a staggered manner. Therefore, time-domain and frequency-domain information may be determined according to the location information and the serial number information.

Furthermore, the polling instruction may also indicate the number of and the utilization of access resources during last polling. The resource utilization may be one of FULL use, HIGH use, MEDIUM use and LOW use, or may be a percentage of used resources or a percentage of left resources.

In addition, the polling instruction may further indicate a feedback resource to be used for feedback by a terminal which will not perform registration.

Optionally, the polling instruction may indicate a dedicated access resource, and then a terminal with high service priority may access using the dedicated access resource.

In S103, the terminal 20 performs registration according to the polling instruction.

If the polling instruction indicates the dedicated access resource and the terminal 20 is a terminal with high service priority (determined by service subscription information of the terminal), the terminal 20 performs registration directly with the dedicated access resource.

For example, if the terminal 20 receives polling instructions from multiple base stations in S102, the terminal 20 firstly selects one base station from the multiple base stations for registration. It is supposed that the selected base station is the base station 10.

It is appreciated that if the terminal 20 receives multiple pieces of cell broadcast information from multiple base stations in S101 and receives multiple polling instructions from the multiple base stations in S102, then the terminal 20 calculates a transmission path loss between the terminal 20 and each of the multiple base stations according to the received information and further selects one base station from the multiple base stations for registration according to the transmission path loss between the terminal 20 and each of the multiple base stations in S103.

Here, a method by which the terminal 20 calculates a transmission loss between the terminal 20 and the base station 10 is described as follows.

It is supposed that the terminal 20 and the base station 10 use the same frequency, for example, a Time Division Duplex (TDD) system.

Here, the cell broadcast information from the base station 10 in S101 includes indication information of downlink transmitted power. For example, the downlink transmitted power is total transmitted power of the cell and transmitted power of a sequence (such as a common reference signal or a beacon signal) with a known content and time length at a certain time and a certain frequency location. It is to be noted that geographically adjacent but different base stations send respective sequences at different time and different frequency locations in the embodiment of the present disclosure, so that interference between different base stations may be reduced. That is, different base stations may use different sequences.

Then, when receiving the cell broadcast information from the base station 10, the terminal 20 may estimate received power, thereby determining actual received power with which the terminal 20 receives the cell broadcast information. Then, the terminal 20 may calculate the transmission path loss between the terminal 20 and the base station 10 according to the downlink transmitted power and the actual received power. Specifically, the terminal 20 may perform calculation according to a difference between the downlink transmitted power and the actual received power.

For improving the accuracy of calculation of the transmission path loss, the terminal 20 may receive the cell broadcast information for many times and smooth multiple estimated transmission path losses. Or, the terminal may cancel interference on the calculated transmission path loss to further improve the accuracy by virtue of received indication information of downlink transmitted power of another base station adjacent to the base station 10.

Then, the terminal 20 may determine the type of an access resource to be used according to the transmission path loss between the terminal 20 and the base station 10. Specifically, if the transmission path loss is higher than a preset loss threshold, the type of the access resource to be used is determined to be a long access resource, otherwise is a normal access resource.

If the access resource to be used is determined to be a long access resource, the terminal 20 subsequently select an access resource from the multiple long access resources (the amount is L, as mentioned above). If the access resource to be used is determined to be a normal access resource, the terminal 20 subsequently selects an access resource from the multiple normal access resources (the amount is N, as mentioned above). If the selected access resource is a first access resource, the terminal 20 may subsequently perform registration on the first access resource.

As an example, the terminal may select the first access resource from the multiple long access resources or the multiple normal access resources according to an ID of the terminal, the cell broadcast information and a timestamp at which the terminal receives the polling instruction. For example, the terminal 20 may generate a characteristic sequence by adopting a hashing function according to the ID of the terminal, the cell broadcast information and the timestamp at which the terminal receives the polling instruction, determine the serial number information and location information of the access resource to be used according to the characteristic sequence, and determine the first access resource according to the serial number information and location information of the access resource to be used.

Here, the ID of the terminal may be an International Mobile Equipment Identity (IMEI). The hashing function may be a HASH function, such as Message Digest 5 (MD5).

Optionally, the characteristic sequence may be generated after subsequent processing by adopting a method of the hashing function. The subsequent processing may be cyclic shift, random shift, Exclusive OR (XOR) with another sequence and the like.

Optionally, if the access resource is determined to be a long access resource, the terminal 20 may determine the serial number information and location information of the access resource to be used according to numerical value(s) of last $\lceil \log_2 L \rceil$ bit(s) in binary form of the characteristic sequence, wherein ⌈ ⌉ represents rounding up, and L represents the number of the long access resources. For example, last 4 bits are "1111$b$" when L=16, and are "1101$b$" when L=14. If the access resource is determined to be a normal access resource, the terminal 20 may determine the serial number information and location information of the access resource to be used according to numerical value(s) of last $\lceil \log_2 N \rceil$ bit(s) of the binary form of the characteristic sequence, wherein ⌈ ⌉ represents rounding up, and N represents the number of the normal access resource.

In such a manner, in the embodiment of the present disclosure, it may be ensured that an access resource selected by each unregistered terminal is unique on time and frequency, and a possibility of a registration conflict between different terminals is very low.

Optionally, as an embodiment, after S102, the terminal 20 judges whether to initiate registration or not at first.

Specifically, the terminal 20 may judge whether to initiate registration or not according to an SFN where the polling instruction in S102 is located, an SFN which is found by the terminal during booting, the number of access resources indicated by the polling instruction in S102, resource utilization during last polling S102, the resource utilization during last polling before S102 and the like.

Here, the SFN found by the terminal 20 during booting may be included in the cell broadcast information.

In the embodiment of the present disclosure, the terminal 20 may set multiple judgment bases and calculate a value corresponding to each judgment basis, called as a characteristic value of the judgment basis. Then, the terminal 20 may calculate a judgment characteristic value according to the characteristic value of each judgment basis. Therefore, the terminal 20 may judge whether to initiate registration during this polling or not according to a magnitude of the judgment characteristic value, wherein initiation of registration may also be understood as initiation of an access request.

Specifically, if the judgment characteristic value is larger than a first threshold, registration is determined to be initiated during this polling. If the judgment characteristic value is smaller than the second threshold, registration is determined not to be initiated during this polling. The first threshold is larger than the second threshold. The first threshold and the second threshold may be determined by the base station according to a current cell state and sent to the terminal 20 via the polling instruction. If the base station 10 does not send the first threshold or the second threshold in the polling instruction, the terminal 20 may automatically calculate and determine the first threshold and the second threshold according to the cell broadcast information and the cell resource utilization.

Optionally, an absolute value of a difference between the SFN of the polling instruction in S102 and the SFN found by the terminal during booting may be determined as a characteristic value of a first judgment basis. The number of the access resources indicated by the polling instruction in S102 may be determined as a characteristic value of a second judgment basis. A reciprocal of a resource utilization rate during last polling before S102 may be determined as a characteristic value of a third judgment basis.

In addition, the number of times of registration delay of the terminal 20 may be stored in the terminal 20, and may be indicated by a counter. Here, the number of times of registration delay (a value of the counter) may be determined as a characteristic value of a fourth judgment basis.

It is appreciated that: if the absolute value of the difference between the SFN at where the polling instruction is located and the SFN found by the terminal during booting is larger, it is indicated that a time for which the terminal 20 may not perform registration is longer, and a priority with which the terminal 20 initiates registration during this polling is higher. If the number of times of registration delay is larger, that is, the value of the counter is larger, it is indicated that the number of times of polling during which the terminal 20 fails to be registered is larger, and the priority with which the terminal 20 initiates registration during this polling is higher.

It is appreciated that if the number of the access resources indicated by the polling instruction in S102 is larger, or, the resource utilization rate during last polling before S102 is lower, it is indicated that there are more available resources during this polling, and a success rate of registration of the terminal 20 during this polling is higher.

Therefore, the terminal 20 may determine a sum of the characteristic value of each judgment basis as the judgment characteristic value, or, the terminal 20 may determine a weighted sum of the characteristic value of each judgment basis as the judgment characteristic value.

Here, a weight (also called as a weighted coefficient) of the characteristic value of each judgment basis may be sent to the terminal 20 by the base station 10 in the cell broadcast information. Specifically, the base station 10 may regulate the weight according to the factors including the MTC service characteristic, the cell resource utilization rate and the like (that is, different cell broadcast information may include different weights), so that a service requirement of a system may be met, and access efficiency of the terminal may be improved. Or, if the cell broadcast information does not include any weight, the weights (also called as the weighted coefficients) may also be determined by the terminal 20 according to the factors such as the MTC service characteristic, which will not be limited herein.

Furthermore, if the judgment characteristic value is larger than the first threshold, registration is determined to be initiated during this polling. After determining to initiate registration, the terminal 20 may perform registration by adopting the above-mentioned method. Moreover, after successful registration, the counter (the number of times of registration delay) may be cleared. Optionally, the terminal 20 may also execute the characteristic value of each judgment basis during execution of registration to the base station 10 after successful registration.

If the judgment characteristic value is smaller than the second threshold, registration is determined not to be initiated during this polling. Then, the terminal 20 may update the counter (the number of times of registration delay), that is, 1 is added to the counter. The terminal 20 may also send the characteristic value of each judgment basis to the base station 10. It is appreciated that the characteristic value, sent to the base station 10 by the terminal 20, of the fourth judgment basis refers to an updated value of the counter.

For example, the terminal 20 may select an access resource (which is supposed to be a second access resource) from the multiple access resources indicated by the polling instruction according to the calculated transmission path loss between the terminal 20 and the base station 10, and the terminal 20 sends a feedback message to the base station 10 on the second access resource to enable the base station 10 to learn about that the terminal 20 determines not to initiate registration during this polling, wherein the feedback message may be sent at a specific symbol of the second access resource, and the feedback message may be a specific signal, such as "1" or another short sequence. Therefore, resources may be saved, feedback accuracy may be improved, and a subsequent processing process of the base station may be simplified.

For example, if the polling instruction in S102 also indicates a feedback resource, the terminal 20 may send the feedback message to the base station 10 on the feedback resource when determining not to initiate registration, wherein the feedback message may include indication information about that the terminal 20 does not perform registration. Therefore, the base station 10 may subsequently perform network optimization according to the feedback message to increase a success rate of registration of the terminal 20 during next polling.

For example, the terminal 20 may select an access resource, which is supposed to be a third access resource, from the multiple access resources. The terminal 20 may reserve a period of time of a front end of the third access resource and then perform monitoring at the reserved time. If the terminal 20 finds a characteristic sequence exists at the reserved time, the terminal 20 may determine to delay registration. Then, the terminal 20 may sends the feedback message, wherein the feedback message includes indication information about that the terminal 20 delays registration. It is appreciated that the characteristic sequence monitored at the reserved time is from another terminal which has been registered, that is, the terminal 20 determines not to perform registration during this polling to avoid a conflict with the another terminal on the third access resource.

In such a manner, the base station 10 may perform further processing according to the feedback message after receiving the feedback message. For example, the base station 10 may receive multiple feedback messages from multiple terminals, and the base station 10 may estimate the number of terminals which send "abandon to access" messages according to the distribution and power of signals in the multiple feedback messages and determine the time of next polling and the allocated access resources based on information such as a radio resource allocation condition of a current cell to improve system efficiency as much as possible on the premise of meeting an MTC service requirement. That is, the base station 10 may regulate information about access resources indicated by a polling instruction to be sent next time according to the feedback message.

In addition, the feedback message sent to the base station 10 by the terminal 20 may further include a reason why the terminal 20 does not initiate registration. If the reason indicates that there are insufficient radio resources left in the current cell and a request from an unregistered terminal cannot be met, then the base station 10 may make a report to a network and an MTC server so as to enable a service provider to expand capacity or take other subsequent measure after receiving the feedback message. That is, the base station 10 may send alarming information to the network equipment for subsequent capacity expansion over the base station.

It is to be noted that the embodiment shown in FIG. 1 does not describe a process that the terminal 20 does not initiate registration, or a process that the base station 10 receives the feedback message, and the like. In the embodiment shown in FIG. 1, it is supposed that the terminal 20 executes a registration process.

In S104, the terminal 20 sends registration information to the base station 10.

As an example, the terminal 20 may estimate a distance between the terminal 20 and the base station 10 according to the calculated transmission path loss between the terminal 20 and the base station 10 and according to the cell transmission environment type in the cell broadcast information, and thus may further calculate a time advance value for the terminal 20 to send registration information. Then, the terminal 20 sends the registration information according to the time advance value in S104.

As another example, the terminal 20 may estimate transmitted power which can ensure the base station 10 to correctly demodulate the reporting information according to the calculated transmission path loss between the terminal 20 and the base station 10 and a modulation and coding scheme of a reporting message, and moreover, may add a certain allowance to the calculated transmitted power for transmission by taking the transmitted power with the allowance as uplink transmitted power.

As a combination of the two examples, the terminal 20 may send the registration information to the base station 10 by adopting the uplink transmitted power and utilizing the time advance value.

Optionally, after S104, if the terminal 20 does not receive a response message from the base station 10 within a preset time length, the terminal 20 re-sends the registration information. The terminal 20 may re-send the registration information at a specific time, wherein the response message may be an Acknowledgement (ACK) or a Negative Acknowledgement (NACK).

Optionally, if the response message from the base station 10 is still not received after a maximum number of re-sending times is reached, the terminal 20 enters a sleep state. The maximum number of the re-sending times may be preset to be, for example, 25.

Here, the registration information may include the ID of the terminal and the type of the terminal. For example, the ID of the terminal may be an IMEI. For example, the type of the terminal may include information about the speed of the terminal, the transmitted power of the terminal and the like. In addition, the type of the terminal may further include the capability of the terminal, for example, information about a delay requirement of the terminal and information about energy saving of the terminal.

In S105, the terminal 20 is subjected to authentication verification from the network equipment 30.

Specifically, after the terminal 20 completes initial registration, the network equipment 30 may send authentication indication information dedicated for the terminal 20 to the terminal 20 through the base station 10 to ask the terminal 20 to report a terminal identity and business registration information. The terminal identity may be an International Mobile Subscriber Identification Number (IMSI). Then, the terminal 20 sends the terminal identity and the business registration information to the base station 10, and the base station 10 forwards the terminal identity and the business registration information to the network equipment 30 to complete authentication verification. The business registration information may include a business type and service subscription information.

In addition, the terminal 20 may further send battery capacity information of the terminal 20 and uplink transmitted power level information of the terminal 20 to the base station 10. Then, the base station 10 may determine battery utilization of the terminal 20 and calculate a received power loss of the base station 10 according to the battery capacity information and the uplink transmitted power level information. On the other hand, if the base station 10 fails to demodulate the battery capacity information and the uplink transmitted power level information, the base station 10 may send instruction information to the terminal 20, the instruction information being used to instruct the terminal to increase the uplink transmitted power of the terminal.

In S106, the base station 10 allocates time-frequency reporting resources to the terminal 20.

After authentication verification is completed, the base station 10 may allocate a reporting manner to the terminal according to the business registration information of the terminal 20. The reporting manner may be periodic or non-periodic (wherein a non-periodic manner may also be called as a configured or scheduling-based manner).

Here, the reporting manner includes time-frequency reporting resource information. Therefore, the terminal 20 may subsequently report data according to the time-frequency reporting resource information.

For a periodic manner, the time-frequency reporting resource information may include time-frequency resource location information and a reporting period. Or, for the periodic manner, the time-frequency reporting resource information includes a time-frequency resource sequence generation manner and a reporting period. For example, the time-frequency resource sequence generation manner may be a manner of generating two-dimensional time-frequency location sequences according to a numerical value of a seed.

Specifically, the base station 10 may determine the time-frequency resource location information or the time-frequency resource sequence generation manner by adopting a certain basis and a certain mathematical calculation method. The adopted basis may be a time-frequency resource location occupied by data reporting, such as a current cell resource allocation condition, cell information, a local ID of the terminal, a time (timestamp) at which initial system synchronization of the terminal occurs, or a combination thereof. The mathematical calculation method may be a hash function or a sequence function.

Specifically, the reporting period may be a fixed time interval. The interval may be determined according to a business requirement of MTC, which for example, may be several seconds or several days.

For the non-periodic manner, the time-frequency reporting resource information includes the time-frequency resource location information and the number of reporting times. Here, if the number of reporting times is K, K may be any positive integer. For example, K=1 or K=10. That is, the base station 10 notifies the terminal 20 of time-frequency resource information used for next or next K reporting.

Specifically, the base station 10 may allocate unique time-frequency reporting resource information to the terminal 20, that is, the base station 10 allocates different time-frequency resource location information to different terminals. Or, the base station 10 may allocate the same time-frequency reporting resource information to multiple terminals in a Multi-User Multi-Input Multi-Output (MU MIMO) manner transparent to the terminals by virtue of characteristics such as spatial isolation and the like. That is, the time-frequency reporting resource information allocated to the terminal 20 by the base station 10 may be the same as time-frequency reporting resource information allocated to another terminal by the base station 10. Therefore, the capacity of the system may be improved, and for an MTC system with fixed deployment locations, it is relatively easier to find multiple MTC terminals suitable for pairing, and a better effect thus can be achieved.

Optionally, as another example, the base station 10 may acquire multiple received power losses calculated by multiple other base stations and regarding to the terminal 20. The base station 10 may determine a location of the terminal 20 according to a received power loss of the base station 10, the multiple received power losses and transmission characteristics of regions where the base station 10 and the multiple other base stations are located, and further allocates the time-frequency reporting resource information to the terminal 20 according to the location of the terminal 20.

Here, the base station 10 may calculate a distance between the terminal 20 and each base station to further determine the location of the terminal 20. The transmission characteristic of each region may include a digital map and/or a transmission model of a place where the cell is located.

In S107, the base station 10 sends time-frequency reporting resource information to the terminal 20.

Before S107, the base station 10 may establish a wireless connection for the terminal 20. Here, the wireless connection may be a Radio Resource Connection (RRC), so that the terminal 20 is in a connected (RRC_CONNECTED) state.

It is to be noted that the base station 10 does not initiatively release the wireless connection in the embodiment of the present disclosure. That is, after the wireless connection is established, the base station does not release the wireless connection even though the terminal 20 enters a long-term sleep state, so that noticeable signaling overhead brought by conversion of connected states of a large number of MTC terminals may be avoided.

However, it is appreciated that the base station 10 may receive a termination request from the network equipment 30 or the terminal 20, and release the wireless connection according to the termination request after subsequent data transmission is ended. There are no limits to the reason why the network equipment 30 or the terminal 20 sends the termination request in the embodiment of the present disclosure. For example, the network equipment 30 may send the termination request to the base station 10 in case of lease expiration or overdue bill of an MTC service. For example, the terminal 20 may send alarming information and send the termination request to the base station 10 when battery power is lower than a preset power threshold. Here, the preset power threshold may be 5% or 3% of a battery capacity of the terminal 20.

Optionally, as an example, before S107, the base station 10 may allocate a unique identifier to the terminal 20 and send the identifier to the terminal 20 before or after S107 or at the same time of S107. A length of the identifier is smaller than a preset threshold, for example, the length of the identifier is smaller than a length of the ID of the terminal.

It is appreciated that the base station 10 acts as a local gateway at this moment. Specifically, the base station 10 may use part of characters of the ID of the terminal 20 as the unique identifier, or the base station 10 may determine a relatively shorter character generated by processing the ID of the terminal 20 through the hash function and the like as the unique identifier. For example, a 16 bit identifier may represent 65535 terminals.

Then, the base station 10 may encode an address for the terminal 20 by virtue of the unique identifier and replace the ID of the terminal 20 with the unique identifier in a paging process for the terminal 20. In such a manner, replacing an ID with a relatively larger length with an identifier with a relatively smaller length in the embodiment may save transmission resources, and may further reduce a battery consumption speed of the terminal 20.

In addition, a length of the header of an Internet Protocol version 4 (IPv4) packet is 24 bytes, therefore, even though a header compression algorithm such as Robust Header Compression (ROHC) is used, great overhead will still be brought for an MTC application which reports an extremely small amount of data, and service life of an equipment battery is greatly shortened. Therefore, before S107, the base station 10 may allocate a local short address to the terminal 20 and send the local short address to the network equipment 30.

It is to be noted that the local short address in the embodiment of the present disclosure may be an IP address, for example, 10.x.x.x. Or, the local short address in the embodiment of the present disclosure may be an ID. A local short address in the ID form may be a numerical value which is set according to the capacity of the base station and is much shorter than the ID (such as IMEI) of the terminal, for example, a serial number from 0 to 4,095 indicated by a 12 bit binary number. Or, the local short address in the embodiment of the present disclosure may also adopt another form, which will not be limited herein.

Moreover, the base station 10 establishes a corresponding relationship between an identifier and a local short address. It is appreciated that the base station 10 is responsible for address translation in a subsequent data transmission process.

Specifically, the base station 10 receives an uplink data packet from the terminal, the uplink data packet including an identifier. The base station 10 replaces the identifier with the local short address and sends the local short address to the network equipment 30. That is, the base station 10 fills the data packet sent to the network equipment 30 by the terminal 20 with a local short address corresponding to the identifier, and determines the local short address as a sending party address of the data packet.

The base station 10 receives a downlink data packet from the network equipment 30, the downlink data packet including the local short address allocated to the terminal. The base station 10 replaces the local short address with the ID and sends the ID to the terminal 20. That is, the base station 10 unpacks the data packet sent to the terminal 20 by the network equipment 30, and adds the ID to a payload part in the data packet and then sends the payload part to the terminal 20.

Or, as another example, the terminal 20 may communicate with the base station 10 through a local IP address of the terminal 20, and the base station 10 may communicate with the network equipment 30 through a local short address. Then, it is appreciated that the base station 10 establishes a corresponding relationship between the local IP address of the terminal 20 and the local short address. Moreover, the base station 10 undertakes the task of translating the two addresses, i.e. the local IP address of the terminal 20 and the local short address, in the subsequent data transmission process.

In S108, the terminal 20 determines a time-frequency reporting resource.

If the time-frequency reporting resource information in S107 includes time-frequency resource location information and a reporting period, the terminal 20 may determine the time-frequency reporting resource according to the time-frequency resource location information.

If the time-frequency reporting resource information in S107 includes time-frequency resource sequence generation manner and a reporting period, the terminal 20 may generate a time-frequency resource sequence according to the time-frequency resource sequence generation manner, and select the time-frequency reporting resource from the time-frequency resource sequence.

If the time-frequency reporting resource information in S107 includes the time-frequency resource location information and the number of reporting times, the terminal 20 may determine the time-frequency reporting resource according to the time-frequency resource location information.

In S109, the terminal 20 sends an uplink data packet to the base station.

Specifically, the terminal 20 sends the uplink data packet according to the time-frequency reporting resource determined in S108.

If the time-frequency reporting resource information in S107 includes information of a time-frequency resource location and a reporting period, the terminal 20 may periodically send the uplink data packet to the base station 10 by the reporting period at the time-frequency resource location.

If the time-frequency reporting resource information in S107 includes the time-frequency resource sequence generation manner and a reporting period, the terminal 20 may generate the time-frequency resource sequence according to the time-frequency resource sequence generation manner, and send the uplink data packet to the base station 10 by the reporting period at the time-frequency resource sequence.

If the time-frequency reporting resource information in S107 includes information of a time-frequency resource location and the number of reporting times, the terminal 20 may periodically send the uplink data packet to the base station 10 at the time-frequency resource location, and the number of sending times is the number of reporting times.

In addition, the terminal 20 may also send the uplink data packet to the base station on the basis of event triggering. Event-triggering-based reporting has higher priority than reporting based on the time-frequency reporting resource information. It is to be noted that the base station 10 may contain a priority instruction in the cell broadcast information or the polling instruction to enable the terminal 20 to learn about that event-triggering-based reporting has higher priority. Correspondingly, the message sent to the base station 10 by the terminal 20 may also include priority indication information. In such a manner, the base station 10 may perform timely processing and give a response when receiving a high-priority message.

For example, event-triggering-based reporting may be that: a motion induction sensor detects a moving object, or a dangerous chemical sensor detects leakage, and the like.

It is to be noted that the terminal 20 may send a scheduling request to the base station 10 to enable the base station 10 to reallocate suitable time-frequency reporting resources to the terminal 20 in S109 if there are insufficient time-frequency reporting resources, that is, if the time-frequency reporting resources are insufficient to accommodate the uplink data packet.

Optionally, in the embodiment of the present disclosure, after S109, the terminal 20 may enter the sleep state. That is, the terminal 20 may enter the sleep state after the process of reporting the uplink data packet is ended, until the next scheduling time comes, so that energy resources can be saved, and specifically, power of the terminal 20 can be saved.

However, since accuracy of a local clock source of the terminal 20 is usually lower and a sleep time of the terminal 20 is usually long, for example, several days, the terminal 20 performs time calibration first after the terminal wakes up from sleep.

Specifically, the base station 10 may locally maintain a relative time offset, and moreover, the base station 10 may send the relative time offset in a broadcast manner. For example, a periodic or regular sending manner may be adopted. Here, the relative time offset is an SFN. It is appreciated that the relative time offset may not be an absolute time here.

After waking up from the sleep state, the terminal 20 monitors the relative time offset sent by the base station 10, and may perform time calibration according to a stored time reference and the relative time offset.

For example, the terminal 20 may wake up one or more SFN periods before the reporting time to listen to SFN information, and then compare it with the time reference stored when the terminal 20 performs registration or the base station 10 initiates time synchronization to determine a time deviation and perform time calibration. The time reference may be a deviation of x microseconds from a received SFN. The base station 10 maintains the relative time offset (such as the SFN), and may acquire the absolute time through a Global Positioning System (GPS), a network time protocol and the like, and may further learn about the specific reporting time of the terminal 20 according to the relative time offset.

In such a manner, in the embodiment, after the terminal 20 completes registration, the base station 10 may initiate a time regulation instruction to implement time synchronization. Then, every time when waking up from sleep, the terminal 20 re-performs time synchronization with the base station 10 according to the relative time offset, thereby ensuring sending of reporting data at a correct time.

It can be seen that such a time calibration method may be considered to have enough accuracy because a wireless transmission path may be considered to be kept unchanged and a transmission delay is basically kept unchanged under the condition that the terminal is kept still after being deployed and the base station is kept unchanged in location. When necessary (for example, the reporting information is not completely received), the base station may initiate time synchronization with the terminal to implement time calibration.

Based on the above analysis, the MTC method in the embodiment of the present disclosure may be applied to a large-scale machine communication system. Terminal registration and scheduling processes therein are simple and consistent, the complexity, power consumption and occupied system resources of a machine communication terminal can be reduced, the deployment cost of an MTC system can be reduced, the service life of battery-powered equipment can be prolonged, and it is beneficial for the application of a future large-scale wireless machine communication system.

Figure 2:
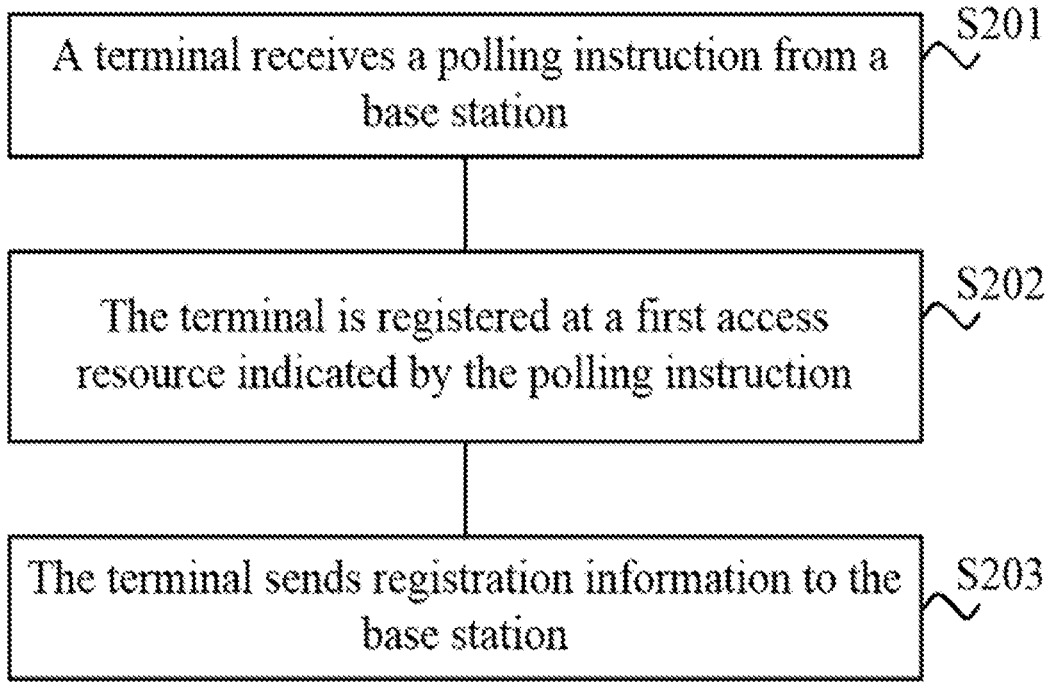
FIG. 2 is a flowchart of an MTC method according to another embodiment of the present disclosure.

FIG. 2 is a flowchart of an MTC method according to another embodiment of the present disclosure. The method shown in FIG. 2 includes the following processes.

In S201, a terminal receives a polling instruction from a base station.

In S202, the terminal performs registration on a first access resource indicated by the polling instruction.

In S203, the terminal sends registration information to the base station.

In the embodiment of the present disclosure, the terminal completes registration according to the polling instruction sent by the base station. Such a process is simple and consistent, which can reduce complexity, power consumption and occupied system resources of a machine communication terminal, and can reduce the deployment cost of an MTC system and prolong the service life of battery-powered equipment.

Optionally, before S201, the following operation may further be included: cell broadcast information sent by the base station is received. The cell broadcast information may include a sending location of the polling instruction. The cell broadcast information may further include a basic parameter of a cell. The basic parameter of the cell may include at least one of: a cell ID, a cell frequency point, a cell frequency bandwidth, an antenna amount, a cell transmission environment type, a cell resource utilization rate, transmitted power of the base station, and an SFN at a broadcast time of the cell broadcast information. Specific descriptions may refer to S101 in the embodiment shown in FIG. 1, and will not be repeated herein. Correspondingly, S201 includes that the polling instruction is received at the sending location.

As an example, in the embodiment of the present disclosure, the polling instruction may indicate a dedicated access resource. In such a manner, in S202, when it is determined that the terminal has high service priority according to service subscription information, registration is performed on the dedicated access resource. That is, the first access resource is the dedicated access resource.

As another example, in the embodiment of the present disclosure, the polling instruction may indicate multiple access resources. The access resources may be long access resources or normal access resources, that is, the polling instruction may indicate multiple long access resources and multiple normal access resources, wherein each of the multiple long access resources includes location information and serial number information, and each of the multiple normal access resources includes location information and serial number information.

In addition, the polling instruction may further indicate serial number information of the access resources, which for example, may indicate that the number of the multiple long access resources is L and the number of the multiple normal access resources is N.

Optionally, the polling instruction may further indicate a feedback resource, used for the terminal to send a feedback message to the base station on the feedback resource.

Then, it is appreciated that the following operations may further be included after S201: a transmission path loss between the terminal and the base station is calculated; it is determined that an access resource to be used is a long access resource or a normal access resource according to the transmission path loss; and the first access resource is selected from the multiple long access resources or the multiple normal access resources.

Here, the transmission path loss between the terminal and the base station may be calculated according to downlink transmitted power included in the cell broadcast information and actual received power with which the terminal 20 receives the cell broadcast information.

For example, the first access resource may be selected from the multiple long access resources or the multiple normal access resources according to an ID of the terminal, the cell broadcast information and a timestamp at which the terminal receives the polling instruction.

Specifically, a characteristic sequence may be generated by a hashing function according to the ID of the terminal, the cell broadcast information and the timestamp at which the terminal receives the polling instruction. The serial number information and location information of the access resource to be used are determined according to the characteristic sequence. The first access resource is determined according to the serial number information and location information of the access resource to be used. The hashing function may be a hash function.

For example, if the access resource to be used is determined to be a long access resource according to the transmission path loss, the first access resource is subsequently selected from the multiple long access resources. The operation that the serial number information and location information of the access resource to be used are determined according to the characteristic sequence may include that: the serial number information and location information of the access resource to be used are determined according to numerical values of last $\lceil \log_2 L \rceil$ bits in binary form of the characteristic sequence, wherein $\lceil \ \rceil$ represents rounding up, and L represents the number of the multiple long access resources.

For example, if the access resource to be used is determined to be a normal access resource according to the transmission path loss, the first access resource is subsequently selected from the multiple normal access resources. The operation that the serial number information and location information of the access resource to be used are determined according to the characteristic sequence may include that: the serial number information and location information of the access resource to be used are determined according to numerical values of last $\lceil \log_2 N \rceil$ bits of the binary form of the characteristic sequence, wherein $\lceil \ \rceil$ represents rounding up, and N represents the number of the multiple normal access resources.

S201 may include that: a polling instruction sent by each of multiple base stations is received. Furthermore, after S201, a transmission path loss between the terminal 20 and each of the multiple base stations is calculated, and one base station is selected from the multiple base stations according to the transmission path loss between the terminal 20 and each of the multiple base stations.

In the embodiment of the present disclosure, S201 may refer to descriptions about S102 in the embodiment shown in FIG. 1, and will not be repeated herein.

Optionally, as an embodiment, before S202, the following operation may further be included: whether to initiate registration or not is judged.

Specifically, whether to initiate registration or not may be judged according to an SFN where the polling instruction is located, an SFN which is found by the terminal during booting, the number of access resources indicated by the polling instruction, and resource utilization during last polling. The resource utilization during last polling is indicated by the polling instruction.

Optionally, the number of times of registration delay of the terminal may be stored in the terminal. Judging whether to initiate registration or not includes that:

an absolute value of a difference between the SFN where the polling instruction is located and the SFN which is found by the terminal during booting is determined as a characteristic value of a first judgment basis; the number of the access resources indicated by the polling instruction is determined as a characteristic value of a second judgment basis; a reciprocal of a resource utilization rate during last polling is determined as a characteristic value of a third judgment basis; and the number of times of registration delay is determined as a characteristic value of a fourth judgment basis;

a sum or a weighted sum of the characteristic value of the first judgment basis, the characteristic value of the second judgment basis, the characteristic value of the third judgment basis and the characteristic value of the fourth judgment basis is determined as a judgment characteristic value;

it is determined to initiate registration if the judgment characteristic value is larger than a first threshold, and it is determined not to initiate registration if the judgment characteristic value is smaller than a second threshold.

Here, a weight (also called as a weighted coefficient) used for the weighted sum is acquired by the terminal from the cell broadcast information sent by the base station, or the weight used for the weighted sum is determined by the terminal according to an MTC service characteristic.

Here, the first threshold is larger than the second threshold. The first threshold and the second threshold are acquired from the polling instruction by the terminal, or the first threshold and the second threshold are determined by the terminal according to the cell broadcast information sent by the base station and cell resource utilization.

When registration is determined to be initiated, the terminal may perform registration by adopting the above-mentioned method, and clear the number of times of registration delay after completing registration. When registration is determined not to be initiated, the terminal may send the feedback message to the base station, wherein the feedback message may include indication information about that the terminal does not perform registration, as well as the characteristic value of the first judgment basis, the characteristic value of the second judgment basis, the characteristic value of the third judgment basis and the characteristic value of the fourth judgment basis.

It is appreciated that the terminal may send the feedback message to the base station on the feedback resource if the polling instruction indicates the feedback resource.

In the embodiment of the present disclosure, S202 may refer to descriptions about S103 in the embodiment shown in FIG. 1, and will not be repeated here.

Optionally, as an embodiment, before S203, the following operations may be included: uplink transmitted power is determined according to the transmission path loss; a distance between the terminal and the base station is estimated according to transmission environment information of the cell; and a time advance value for sending is determined according to the transmission path loss and the distance. In such a manner, in S203, the registration information may be sent to the base station by adopting the uplink transmitted power and utilizing the time advance value.

Here, the transmission path loss between the terminal and the base station may be calculated according to the downlink transmitted power included in the cell broadcast information and the actual received power with which the terminal receives the cell broadcast information.

Here, the registration information may include the ID of the terminal and the type of the terminal.

In the embodiment of the present disclosure, S203 may refer to descriptions about S104 in the embodiment shown in FIG. 1, and will not be repeated here.

Furthermore, after S203, the terminal re-sends the registration information if the terminal fails to receive a response message from the base station within a preset time length. The terminal enters a sleep state if the terminal fails to receive the response message from the base station after a maximum number of re-sending times is reached.

Furthermore, after S203, the following operations may further be included: authentication indication information forwarded by the base station is received, wherein the authentication indication information is received from network equipment by the base station; authentication verification with the network equipment is completed according to the authentication indication information; a terminal identity and business registration information are sent to the base station, the business registration information including a business type and service subscription information; information of a time-frequency reporting resource sent by the base station is received; and a data packet is sent to the base station on the time-frequency reporting resource. Specifically, descriptions about authentication verification may refer to related descriptions in the embodiment shown in FIG. 1, and will not be repeated here.

Figure 3:
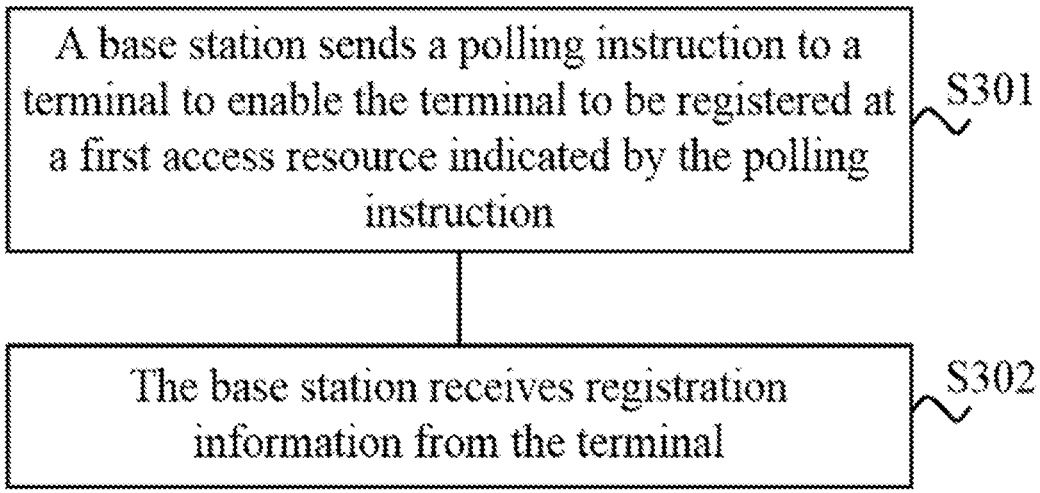
FIG. 3 is a flowchart of an MTC method according to another embodiment of the present disclosure.

FIG. 3 is a flowchart of an MTC method according to another embodiment of the present disclosure. The method shown in FIG. 3 includes the following processes.

In S301, a base station sends a polling instruction to a terminal to enable the terminal to perform registration on a first access resource indicated by the polling instruction.

In S302, the base station receives registration information from the terminal.

In the embodiment of the present disclosure, the base station sends the polling instruction to the terminal to enable the terminal to complete registration according to the polling instruction. Such a process is simple and consistent, which can reduce complexity, power consumption and occupied system resources of a machine communication terminal, and can further reduce the deployment cost of an MTC system and prolong the service life of battery-powered equipment.

Optionally, before S201, the following operation may further be included: cell broadcast information is sent through broadcast, wherein the cell broadcast information may include a sending location of the polling instruction to enable the terminal to receive the polling instruction at the sending location.

In addition, the cell broadcast information may further include a basic parameter of a cell, and the basic parameter of the cell may include at least one of: a cell ID, a cell frequency point, a cell frequency bandwidth, an antenna amount, a cell transmission environment type, a cell resource utilization rate, transmitted power of the base station and an SFN at a broadcast time of the cell broadcast information.

Specifically, the base station may send the cell broadcast information through broadcast on a dedicated frequency where no data is born by adopting transmitted power not lower than a preset value.

In the embodiment of the present disclosure, the polling instruction may indicate multiple long access resources and multiple normal access resources, each of the multiple long access resources including location information and serial number information, and each of the multiple normal access resources including location information and serial number information.

The polling instruction may further indicate a feedback resource. Furthermore, the method shown in FIG. 3 may further include that: a feedback message sent by the terminal is received on the feedback resource, the feedback message including indication information about that the terminal does not perform registration and a characteristic value of each judgment basis; access resources indicated by a next polling instruction are regulated according to the feedback message; or, alarming information is sent to network equipment for subsequent capacity expansion of the base station according to the feedback message.

In the embodiment of the present disclosure, S301 may refer to descriptions about S102 in the embodiment shown in FIG. 1, and will not be repeated here.

In the embodiment of the present disclosure, the registration information may include an ID of the terminal and the type of the terminal.

In addition, it is appreciated that: if the base station acquires multiple received power losses calculated by multiple other base stations and regarding to the terminal, the base station determines a location of the terminal according to a received power loss of the base station, the multiple received power losses and a transmission characteristic of a region where the base station and the multiple base stations are located, wherein the transmission characteristic includes a digital map and a transmission model of a place where the cell is located.

In the embodiment of the present disclosure, S302 may refer to descriptions about S104 in the embodiment shown in FIG. 1, and will not be repeated here.

Optionally, after S302, the following operations may further be included: authentication indication information sent for the terminal by the network equipment is received; the authentication indication information is forwarded to the terminal to enable the terminal to be subjected to authentication verification from the network equipment; business registration information sent by the terminal is received, the business registration information including a business type and service subscription information; time-frequency reporting resource information is allocated to the terminal according to a terminal identity and the business registration information; and an uplink data packet sent by the terminal according to the time-frequency reporting resource information is received. Specifically, such a process may refer to descriptions about S105 to S109 in the embodiment shown in FIG. 1, and will not be repeated herein.

Optionally, after S302, the following operations may further be included: a wireless connection is established for the terminal, and the wireless connection is not initiatively released. Then, a termination request sent by the network equipment or the terminal may be received, and the wireless connection is released according to the termination request.

Figure 4:
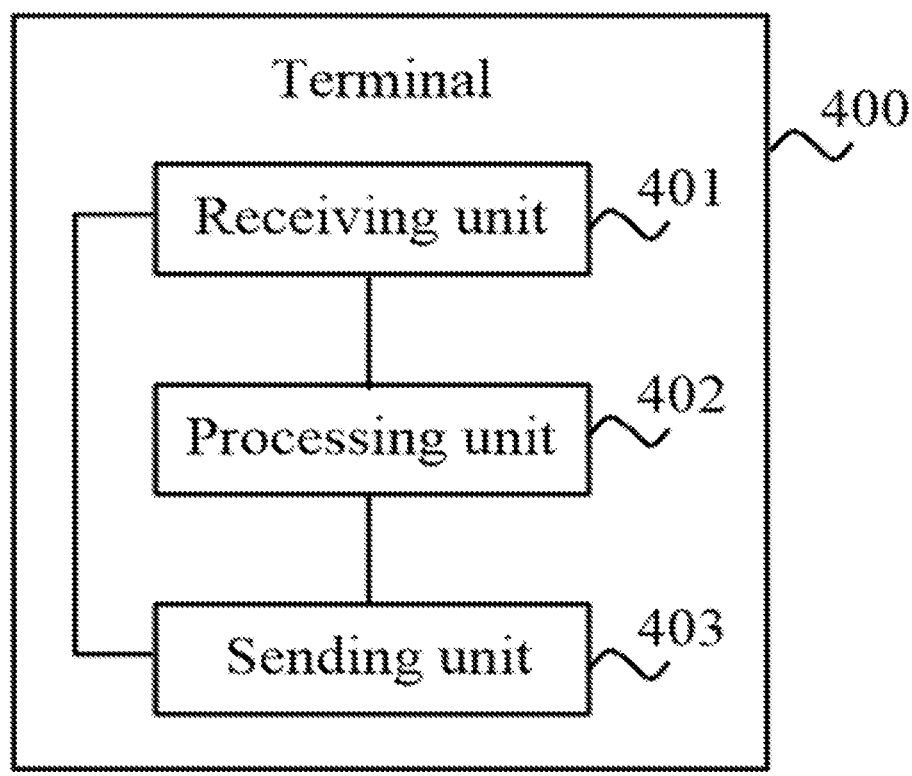
FIG. 4 is a block diagram of a terminal according to an embodiment of the present disclosure.

FIG. 4 is a block diagram of a terminal according to an embodiment of the present disclosure. The terminal 400 shown in FIG. 4 includes a receiving unit 401, a processing unit 402 and a sending unit 403.

The receiving unit 401 is arranged to receive a polling instruction from a base station.

The processing unit 402 is arranged to perform registration on a first access resource indicated by the polling instruction received by the receiving unit 401.

The sending unit 403 is arranged to send registration information to the base station.

In the embodiment of the present disclosure, the terminal completes registration according to the polling instruction from the base station. Such a process is simple and consistent, which can reduce complexity, power consumption and occupied system resources of a machine communication terminal, and can reduce the deployment cost of an MTC system and prolong the service life of battery-powered equipment.

Optionally, as an embodiment, the receiving unit 401 is specifically arranged to receive cell broadcast information from the base station.

The cell broadcast information may include a sending location of the polling instruction, and the receiving unit 401 is specifically arranged to receive the polling instruction at the sending location.

Optionally, as another embodiment, the cell broadcast information includes transmission environment information of a cell where the base station is located. The processing unit 402 is further arranged to calculate a transmission path loss between the terminal and the base station according to the cell broadcast information, determine uplink transmitted power according to the transmission path loss, estimate a distance between the terminal and the base station according to the transmission environment information of the cell, and determine a time advance value for sending according to the transmission path loss and the distance. The sending unit 403 is specifically arranged to send the registration information to the base station by adopting the uplink transmitted power and utilizing the time advance value.

Optionally, as another embodiment, the polling instruction indicates a dedicated access resource, and the processing unit 402 is specifically arranged to perform registration on the dedicated access resource when it is determined that the terminal has high service priority according to service subscription information.

Optionally, as another embodiment, the polling instruction indicates multiple long access resources and multiple normal access resources. The processing unit 402 is further arranged to calculate the transmission path loss between the terminal and the base station, determine that an access resource to be used is a long access resource or a normal access resource according to the transmission path loss and select the first access resource from the multiple long access resources or the multiple normal access resources.

Optionally, as another embodiment, the processing unit 402 is specifically arranged to select the first access resource from the multiple long access resources or the multiple normal access resources according to an ID of the terminal, the cell broadcast information and a timestamp at which the terminal receives the polling instruction.

Optionally, as another embodiment, each of the multiple long access resources includes location information and serial number information, and each of the multiple normal access resources includes location information and serial number information. The processing unit 402 is specifically arranged to generate a characteristic sequence by adopting a hashing function according to the ID of the terminal, the cell broadcast information and the timestamp at which the terminal receives the polling instruction, determine the serial number information and location information of an access resource to be used according to the characteristic sequence, and determine the first access resource in the multiple long access resources or the multiple normal access resources according to the serial number information and location information of the access resource to be used, wherein the hashing function may be a hash function.

Optionally, as another embodiment, the processing unit 402 is specifically arranged to determine the serial number information and location information of the access resource to be used according to numerical values of last $\lceil \log_2 N \rceil$ bits in binary form of the characteristic sequence, wherein $\lceil \ \rceil$ represents rounding up, and N represents the number of the multiple long access resources or represents the number of the multiple normal access resources.

Optionally, as another embodiment, the sending unit 403 is further arranged to re-send the registration information if the terminal fails to receive a response message of the base station within a preset time length.

Optionally, as another embodiment, the processing unit 402 is further arranged to enable the terminal to enter a sleep state if the terminal fails to receive the response message of the base station after a maximum number of re-sending times is reached.

Optionally, as another embodiment, the processing unit 402 is further arranged to judge whether to initiate registration or not. Specifically, whether to initiate registration or not may be judged according to an SFN where the polling instruction is located, an SFN found by the terminal during booting, the number of access resources indicated by the polling instruction, and resource utilization during last polling, wherein the resource utilization during last polling is indicated by the polling instruction.

Optionally, as another embodiment, the number of times of registration delay of the terminal is stored in the terminal. The processing unit 402 is specifically arranged to determine an absolute value of a difference between the SFN where the polling instruction is located and the SFN found by the terminal during booting as a characteristic value of a first judgment basis, determine the number of the access resources indicated by the polling instruction as a characteristic value of a second judgment basis, determine a reciprocal of a resource utilization rate during last polling as a characteristic value of a third judgment basis, determine the number of times of registration delay as a characteristic value of a fourth judgment basis, determine a sum or weighted sum of the characteristic value of the first judgment basis, the characteristic value of the second judgment basis, the characteristic value of the third judgment basis and the characteristic value of the fourth judgment basis as a judgment characteristic value, determine to initiate registration if the judgment characteristic value is larger than a first threshold, and determine not to initiate registration if the judgment characteristic value is smaller than a second threshold. A weight used for the weighted sum is acquired by the terminal from the cell broadcast information sent by the base station, or the weight used for the weighted sum is determined by the terminal according to an MTC service characteristic. The first threshold is larger than the second threshold. The first threshold and the second threshold are acquired from the polling instruction by the terminal, or the first threshold and the second threshold are determined by the terminal according to the cell broadcast information sent by the base station and cell resource utilization.

Optionally, as another embodiment, when the processing unit 402 determines not to initiate registration, the sending unit 403 is further arranged to send a feedback message to the base station. The feedback message includes indication information about that the terminal does not perform registration, as well as the characteristic value of the first judgment basis, the characteristic value of the second judgment basis, the characteristic value of the third judgment basis and the characteristic value of the fourth judgment basis.

For example, the feedback message may be sent to the base station on the feedback resource indicated by the polling instruction.

Optionally, as another embodiment, the receiving unit 401 is specifically arranged to receive a polling instruction from each of multiple base stations. The processing unit 402 is further arranged to calculate a transmission path loss between the terminal 20 and each of the multiple base stations, and select one base station from the multiple base stations according to the transmission path loss between the terminal 20 and each of the multiple base stations.

Optionally, as another embodiment, the registration information includes the ID of the terminal and the type of the terminal.

Optionally, as another embodiment, the receiving unit 401 may further be arranged to receive authentication indication information forwarded by the base station, wherein the authentication indication information is received from network equipment by the base station. The processing unit 402 may further be arranged to be subjected to authentication verification from the network equipment according to the authentication indication information. The sending unit 403 may further be arranged to send a terminal identity and business registration information to the base station, the business registration information including a business type and the service subscription information. The receiving unit 401 may further be arranged to receive information of a time-frequency reporting resource from the base station. The sending unit 403 may further be arranged to send an uplink data packet to the base station on the time-frequency reporting resource.

Optionally, as another embodiment, the network equipment is any one of: a wireless access network, a subscriber identity data server (such as an HLR), an authentication server and an MTC service subscription server.

Figure 5:
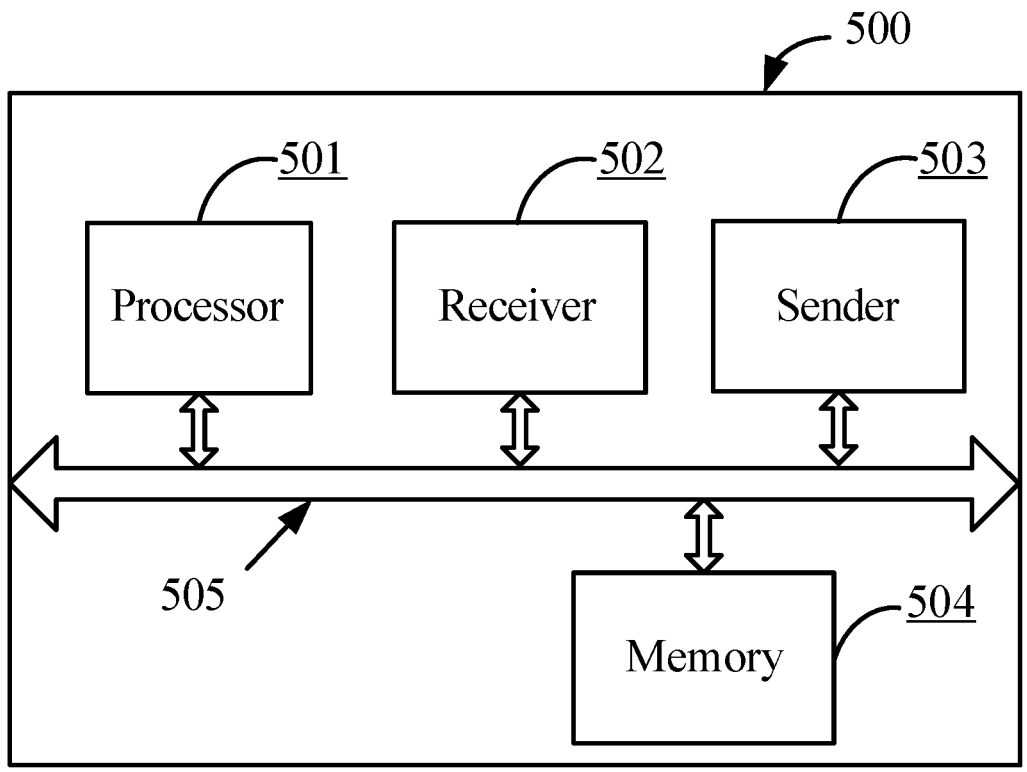
FIG. 5 is a block diagram of a terminal according to another embodiment of the present disclosure.

It is to be noted that in the embodiment of the present disclosure, the receiving unit 401 may be implemented by a receiver, the sending unit 403 may be implemented by a sender, and the processing unit 402 may be implemented by a processor. As shown in FIG. 5, a terminal 500 may include a processor 501, a receiver 502, a sender 503 and a memory 504. The memory 504 may be arranged to store the number of times of registration delay, and may further be arranged to store a code and the like executable by the processor 501.

All components in the terminal 500 are coupled together through a bus system 505. The bus system 505 further includes a power bus, a control bus and a state signal bus, besides a data bus.

The terminal 400 shown in FIG. 4 or the terminal 500 shown in FIG. 5 may realize each process implemented by the terminal in the embodiments shown in FIG. 1 and FIG. 2, and will not be repeated here.

Figure 6:
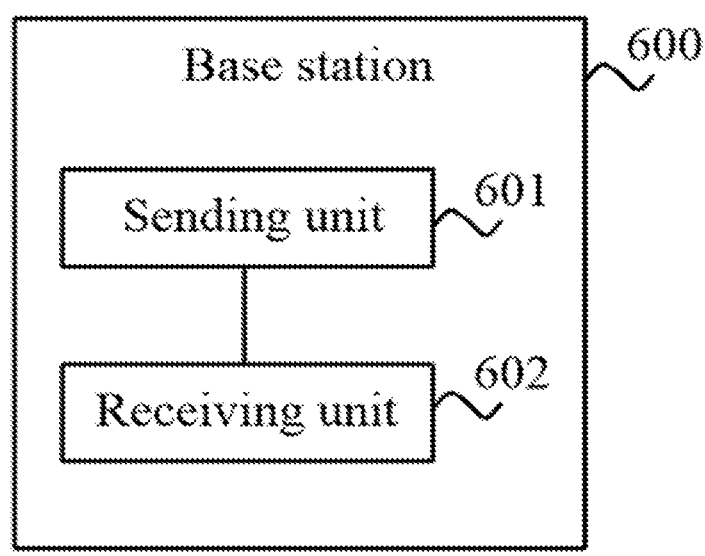
FIG. 6 is a block diagram of a base station according to an embodiment of the present disclosure.

FIG. 6 is a block diagram of a base station according to an embodiment of the present disclosure. The base station 600 shown in FIG. 6 includes a sending unit 601 and a receiving unit 602.

The sending unit 601 is arranged to send a polling instruction to a terminal to enable the terminal to perform registration on a first access resource indicated by the polling instruction.

The receiving unit 602 is arranged to receive registration information from the terminal.

In the embodiment of the present disclosure, the base station sends the polling instruction to the terminal to enable the terminal to complete registration according to the polling instruction. Such a process is simple and consistent, which can reduce complexity, power consumption and occupied system resources of a machine communication terminal, and can further reduce the deployment cost of an MTC system and prolong the service life of battery-powered equipment.

Optionally, as an embodiment, the sending unit 601 may further be arranged to send cell broadcast information through broadcast. The cell broadcast information includes a sending location of the polling instruction to enable the terminal to receive the polling instruction at the sending location.

Here, the cell broadcast information may further include at least one of: a cell ID, a cell frequency point, a cell frequency bandwidth, an antenna amount, a cell transmission environment type, an SFN, a cell resource utilization rate, and transmitted power of the base station.

Optionally, as another embodiment, the sending unit 601 is arranged to send the cell broadcast information through broadcast on a dedicated frequency where no data is born by adopting transmitted power not lower than a preset value.

Optionally, as another embodiment, the polling instruction indicates multiple long access resources and multiple normal access resources, each of the multiple long access resources including location information and serial number information, and each of the multiple normal access resources including location information and serial number information.

Optionally, as another embodiment, the base station 600 may further include a processing unit. The polling instruction further indicates a feedback resource. The receiving unit 602 may further be arranged to receive a feedback message from the terminal on the feedback resource, the feedback message including indication information about that the terminal does not perform registration and a characteristic value of each judgment basis. The processing unit is arranged to regulate access resources indicated by a next polling instruction according to the feedback message, or send alarming information to network equipment for subsequent capacity expansion of the base station according to the feedback message.

Optionally, the registration information received by the receiving unit 602 may include an ID of the terminal and a type of the terminal.

Optionally, as another embodiment, the receiving unit 602 may further be arranged to acquire multiple received power losses calculated by multiple other base stations and regarding to the terminal. The processing unit may further be arranged to determine a location of the terminal according to a received power loss of the base station, the multiple received power losses and a transmission characteristic of a region where the base station and the multiple base stations are located. The transmission characteristic includes a digital map and a transmission model of a place where the cell is located.

Optionally, as another embodiment, the receiving unit 602 may further be arranged to receive authentication indication information sent for the terminal by the network equipment. The sending unit 601 may further be arranged to forward the authentication indication information to the terminal to enable the terminal to be subjected to authentication verification from the network equipment. The receiving unit 602 may further be arranged to receive a terminal identity and business registration information from the terminal, the business registration information including a business type and service subscription information. The processing unit is arranged to allocate time-frequency reporting resource information to the terminal according to the business registration information. The receiving unit 602 is further arranged to receive an uplink data packet from the terminal according to the time-frequency reporting resource information.

Optionally, as another embodiment, the processing unit may further be arranged to establish a wireless connection for the terminal. Furthermore, the receiving unit 602 may further be arranged to receive a termination request from the network equipment or the terminal. The processing unit is further arranged to release the wireless connection according to the termination request.

Figure 7:
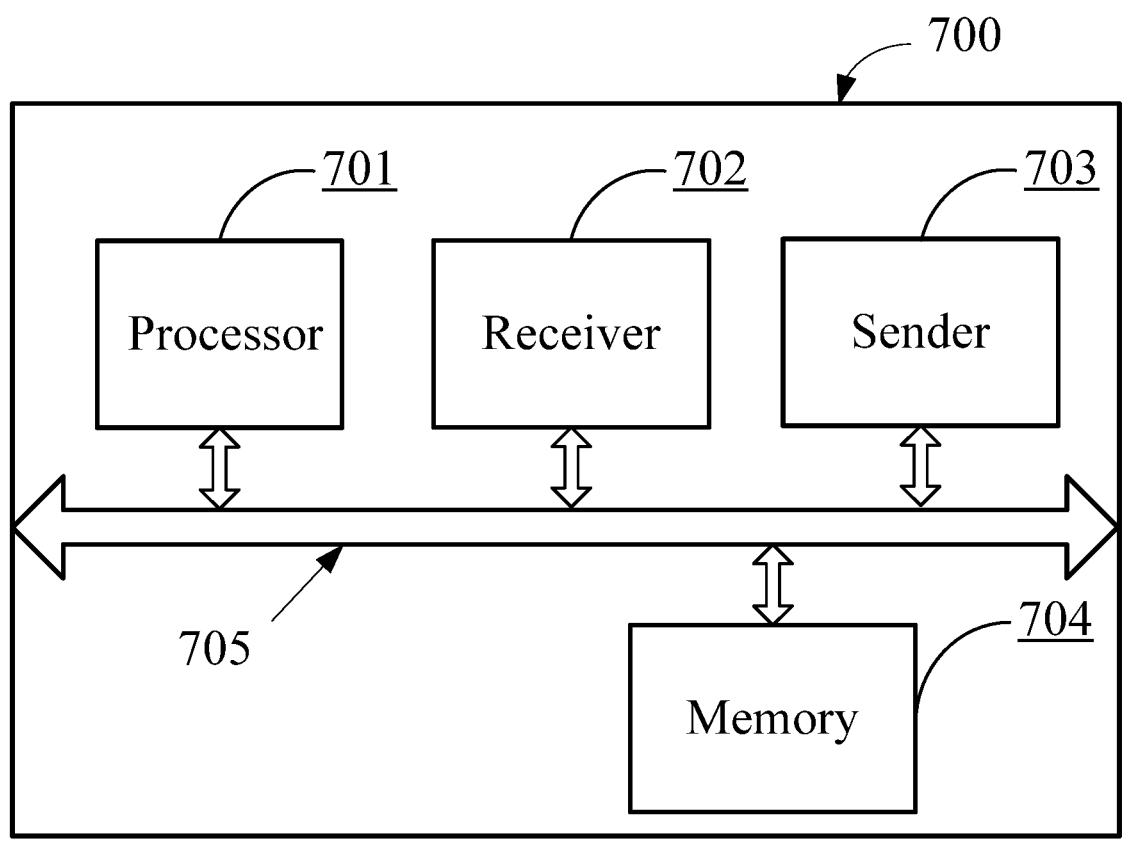
FIG. 7 is a block diagram of a base station according to another embodiment of the present disclosure.

It is to be noted that: in the embodiment of the present disclosure, the receiving unit 602 may be implemented by a receiver, the sending unit 601 may be implemented by a sender and the processing unit may be implemented by a processor. As shown in FIG. 7, a base station 700 may include a processor 701, a receiver 702, a sender 703 and a memory 704. The memory 704 may be arranged to store a code and the like executable by the processor 701.

All components in the base station 700 are coupled together through a bus system 705. The bus system 705 further includes a power bus, a control bus and a state signal bus, besides a data bus.

The base station 600 shown in FIG. 6 or the base station 700 shown in FIG. 7 may implement each process implemented by the base station in the embodiments shown in FIG. 1 and FIG. 2, and will not be repeated here.

It is to be noted that the method embodiments of the present disclosure may be applied to a processor or implemented by the processor. The processor may be an integrated circuit chip, and has a signal processing capability. In an implementation process, each step of the method embodiments may be implemented by an integrated logic circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logic device, discrete gate or transistor logic device and discrete hardware component. Each method, step and logic block diagram disclosed in the embodiments of the present disclosure may be implemented or executed. The universal processor may be a microprocessor or any conventional processor and the like. The method disclosed in the embodiments of the present disclosure may directly be embodied as execution and implementation with a hardware decoding processor or with a combination of hardware and software module in the decoding processor. The software module may be located in a familiar storage medium in the art such as a random memory, a flash memory, a Read-Only Memory (ROM), a Programmable ROM (PROM), or an Electrically Erasable PROM (EEPROM) and a register. The storage medium is located in a memory. The processor reads information in the memory, and implements the processes in the method in combination with the hardware.

It is appreciated that the memory in the embodiments of the present disclosure may be a volatile memory or a nonvolatile memory, or may include volatile and nonvolatile memories. The nonvolatile memory may be a ROM, a PROM, an Erasable PROM (EPROM), an EEPROM or a flash memory. The volatile memory may be a Random Access Memory (RAM), and serves as an external high-speed cache. Exemplarily but unlimitedly, various RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory for the system and method described in the present disclosure is intended to include, but not limited to, these memories and any other suitable memories.

Those skilled in the art may realize that the unit and algorithm of each example described in the embodiments disclosed in the present disclosure may be implemented by electronic hardware or a combination of computer software and the electronic hardware. Whether to realize these functions by hardware or software depends to specific application and design constraints of the technical solutions. Those skilled in the art may realize the described functions for each specific application by different methods, but such realization shall not be beyond the scope of the present disclosure.

Those skilled in the art may clearly know that specific working processes of the system, devices and units described above may refer to the corresponding processes in the method embodiments and will not be repeated here for convenient and brief description.

In some embodiments provided by the present disclosure, it is appreciated that the disclosed system, device and method may be implemented in another manner. For example, the device embodiment described above is only schematic. For example, division of the units is only division of logic functions, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, between the devices or the units, which may be electrical and mechanical or in other forms.

The above-mentioned units described as separate parts may or may not be physically separated. The parts displayed as units may or may not be physical units, namely, the parts may be located in the same place, or may be distributed to multiple network units. Part or all of the units may be selected to implement the embodiments according to a practical requirement.

In addition, each function unit in each embodiment of the present disclosure may be integrated into a processing unit, each unit may also physically exist independently, and at least two units may also be integrated into a unit.

When being implemented in form of software function unit and sold or used as an independent product, the function may also be stored in a computer-readable storage medium. Based on such an understanding, the technical solutions of the present disclosure substantially or parts making contributions to a conventional art or part of the technical solutions may be embodied by a software product, and the computer software product is stored in a storage medium, including a plurality of instructions used to enable computer equipment (which may be a personal computer, a server, network equipment and the like) to execute all or part of the processes in each embodiment of the present disclosure. The above-mentioned storage medium includes various media capable of storing program codes such as a U disk, a mobile hard disk, a ROM, a RAM, a magnetic disk or an optical disk.

The above is only the specific implementation modes of the present disclosure and not intended to limit the scope of protection of the present disclosure. Any variations or replacements apparent to those skilled in the art within the technical scope of the present disclosure shall fall within the scope of protection of the present disclosure. Therefore, the scope of protection of the present disclosure shall be subject to the scope of protection of the claims.

What is claimed is:

1. A method for Machine Type Communication (MTC), performed by a terminal, the method comprising:
   receiving, by the terminal, a polling instruction from a base station;
   performing, by the terminal, registration on a first access resource indicated by the polling instruction; and
   sending, by the terminal, registration information to the base station, the registration information comprising an identification (ID) of the terminal and a type of the terminal, and the type of the terminal comprising at least one of information about speed of the terminal or transmit power of the terminal.

2. The method according to claim 1, wherein the polling instruction indicates a dedicated access resource;
   performing registration on the first access resource indicated by the polling instruction comprises: performing registration on the dedicated access resource when the terminal is determined to have high service priority according to service subscription information.

3. The method according to claim 1, wherein the polling instruction indicates multiple long access resources and multiple normal access resources;
   before performing registration on the first access resource indicated by the polling instruction, the method further comprises:
   calculating a transmission path loss between the terminal and the base station;
   determining that an access resource to be used is a long access resource or a normal access resource according to the transmission path loss; and
   selecting the first access resource from the multiple long access resources or the multiple normal access resources.

4. The method according to claim 3, wherein selecting the first access resource from the multiple long access resources or the multiple normal access resources comprises:
   selecting the first access resource from the multiple long access resources or the multiple normal access resources according to the ID of the terminal, cell broadcast information and a timestamp at which the terminal receives the polling instruction.

5. The method according to claim 3, wherein each of the multiple long access resources comprises location information and serial number information; each of the multiple normal access resources comprises location information and serial number information;
   selecting the first access resource from the multiple long access resources or the multiple normal access resources comprises:
   generating a characteristic sequence by adopting a hashing function according to the ID of the terminal, the cell broadcast information and the timestamp at which the terminal receives the polling instruction;
   determining serial number information and location information of the access resource to be used according to the characteristic sequence; and
   determining the first access resource among the multiple long access resources or the multiple normal access resources according to the serial number information and the location information of the access resource to be used.

6. The method according to claim 5, wherein determining the serial number information and the location information of the access resource to be used according to the characteristic sequence comprises:
   determining the serial number information and the location information of the access resource to be used according to numerical values of last $\lceil \log_2^N \rceil$ bits in binary form of the characteristic sequence;
   wherein $\lceil\ \rceil$ represents rounding up, and N represents the number of the multiple long access resources or the number of the multiple normal access resources.

7. The method according to claim 1, before performing the registration on the first access resource indicated by the polling instruction, the method further comprising:
   judging whether to initiate the registration or not according to a System Frame Number (SFN) where the polling instruction is located, an SFN which is found by the terminal during booting, the number of access resources indicated by the polling instruction, and resource utilization, indicated by the polling instruction, during last polling.

8. The method according to claim 7, wherein the terminal stores the number of times of registration delay;
   judging whether to initiate the registration or not comprises:
   determining an absolute value of a difference between the SFN where the polling instruction is located and the SFN which is found by the terminal during booting as a characteristic value of a first judgment basis, determining the number of the access resources indicated by the polling instruction as a characteristic value of a second judgment basis, determining a reciprocal of a resource utilization rate during last polling as a characteristic value of a third judgment basis, and determining the number of times of registration delay as a characteristic value of a fourth judgment basis;
   determining a sum or a weighted sum of the characteristic value of the first judgment basis, the characteristic value of the second judgment basis, the characteristic value of the third judgment basis and the characteristic value of the fourth judgment basis as a judgment characteristic value; and
   determining to initiate the registration when the judgment characteristic value is larger than a first threshold, and determining not to initiate the registration when the judgment characteristic value is smaller than a second threshold;
   wherein a weight used for the weighted sum is acquired by the terminal from cell broadcast information sent by the base station, or a weight used for the weighted sum is determined by the terminal according to an MTC service characteristic;
   wherein the first threshold is larger than the second threshold, the first threshold and the second threshold are acquired by the terminal from the polling instruction, or the first threshold and the second threshold are determined by the terminal according to the cell broadcast information sent by the base station and cell resource utilization.

9. A method for Machine Type Communication (MTC), performed by a base station, the method comprising:
   sending, by the base station, a polling instruction to a terminal to enable the terminal to perform registration on a first access resource indicated by the polling instruction; and receiving, by the base station, registration information from the terminal, the registration information comprising an identification (ID) of the terminal and a type of the terminal, and the type of the terminal comprising at least one of information about speed of the terminal or transmit power of the terminal.

10. The method according to claim 9, wherein
the polling instruction indicates multiple long access resources and multiple normal access resources, each of the multiple long access resources comprising location information and serial number information, and each of the multiple normal access resources comprising location information and serial number information;

or, the polling instruction indicates a feedback resource, and the method further comprises:
    receiving a feedback message from the terminal on the feedback resource, the feedback message comprising indication information about that the terminal does not perform the registration and comprising a characteristic value of each judgment basis; and
    regulating an access resource indicated by a next polling instruction according to the feedback message; or sending alarming information to network equipment for subsequent capacity expansion of the base station according to the feedback message;

or, the method further comprising:
    acquiring, by the base station, multiple received power losses calculated by multiple other base stations and regarding to the terminal; and
    determining, by the base station, a location of the terminal according to a received power loss of the base station, the multiple received power losses and a transmission characteristics of a region where the base station and the multiple other base stations are located;
    wherein the transmission characteristic comprises a digital map and a transmission model of a place where a cell is located;

or, the method further comprising:
    receiving authentication indication information sent by network equipment and regarding to the terminal;
    forwarding the authentication indication information to the terminal to enable the terminal to be subjected to authentication verification from the network equipment;
    receiving a terminal identity and business registration information from the terminal, the business registration information comprising a business type and service subscription information;
    allocating time-frequency reporting resource information to the terminal according to the business registration information; and
    receiving an uplink data packet from the terminal according to the time-frequency reporting resource information;
        wherein before allocating the time-frequency reporting resource information to the terminal according to the business registration information, the method further comprising:
            establishing a wireless connection for the terminal;
            receiving a termination request from the network equipment or the terminal; and
            releasing the wireless connection according to the termination request.

11. A terminal, comprising:
a receiver, a processor and a sender, wherein the receiver, the processor and the sender are coupled with each other through a bus system; wherein
the receiver is arranged to receive a polling instruction from a base station;
the processor is arranged to perform registration on a first access resource indicated by the polling instruction received by the receiver; and
the sender is arranged to send registration information to the base station, the registration information comprising an identification (ID) of the terminal and a type of the terminal, and the type of the terminal comprising at least one of information about speed of the terminal or transmit power of the terminal.

12. The terminal according to claim 11, wherein the receiver is further arranged to receive cell broadcast information from the base station.

13. The terminal according to claim 12, wherein
the cell broadcast information comprises a sending location of the polling instruction; and the receiver is arranged to receive the polling instruction at the sending location;

or, the cell broadcast information comprises transmission environment information of a cell where the base station is located;
    the processor is further arranged to:
        calculate a transmission path loss between the terminal and the base station according to the cell broadcast information;
        determine uplink transmitted power according to the transmission path loss;
        estimate a distance between the terminal and the base station according to the transmission environment information of the cell; and
        determine a time advance value for sending according to the transmission path loss and the distance;
    and, the sender is arranged to:
        send the registration information to the base station by adopting the uplink transmitted power and utilizing the time advance value.

14. The terminal according to claim 11, wherein the polling instruction indicates multiple long access resources and multiple normal access resources;
the processor is further arranged to:
    calculate a transmission path loss between the terminal and the base station;
    determine that an access resource to be used is a long access resource or a normal access resource according to the transmission path loss; and
    select the first access resource from the multiple long access resources or the multiple normal access resources.

15. The terminal according to claim 14, wherein each of the multiple long access resources comprises location information and serial number information, and each of the multiple normal access resources comprises location information and serial number information;
the processor is arranged to:
    generate a characteristic sequence by adopting a hashing function according to the ID of the terminal, the cell broadcast information and the timestamp at which the terminal receives the polling instruction;

determine serial number information and location information of the access resource to be used according to the characteristic sequence; and determine the first access resource among the multiple long access resources or the multiple normal access resources according to the serial number information and the location information of the access resource to be used.

16. The terminal according to claim 15, wherein the processor is arranged to:

determine the serial number information and the location information of the access resource to be used according to numerical values of last $\lceil \log_2 N \rceil$ bits in binary form of the characteristic sequence;

wherein $\lceil\ \rceil$ represents rounding up, and N represents the number of the multiple long access resources or the number of the multiple normal access resources.

17. The terminal according to claim 11, wherein the sender is further arranged to:

re-send the registration information if the terminal fails to receive a response message from the base station within a preset time length; and the processor is further arranged to cause the terminal to enter a sleep state if the terminal fails to receive the response message from the base station after a maximum number of re-sending times is reached.

18. The terminal according to claim 11, wherein the processor is further arranged to judge whether to initiate the registration or not according to a System Frame Number (SFN) where the polling instruction is located, an SFN which is found by the terminal during booting, the number of access resources indicated by the polling instruction, and resource utilization, indicated by the polling instruction, during last polling.

19. The terminal according to claim 18, wherein the terminal stores the number of times of registration delay;

the processor is arranged to:

determine an absolute value of a difference between the SFN where the polling instruction is located and the SFN which is found by the terminal during booting as a characteristic value of a first judgment basis, determine the number of the access resources indicated by the polling instruction as a characteristic value of a second judgment basis, determine a reciprocal of a resource utilization rate during last polling as a characteristic value of a third judgment basis, and determine the number of times of registration delay as a characteristic value of a fourth judgment basis;

determine a sum or a weighted sum of the characteristic value of the first judgment basis, the characteristic value of the second judgment basis, the characteristic value of the third judgment basis and the characteristic value of the fourth judgment basis as a judgment characteristic value; and determine to initiate the registration when the judgment characteristic value is larger than a first threshold, and determine not to initiate the registration when the judgment characteristic value is smaller than a second threshold;

wherein a weight used for the weighted sum is acquired by the terminal from cell broadcast information sent by the base station, or a weight used for the weighted sum is determined by the terminal according to an MTC service characteristic;

wherein the first threshold is larger than the second threshold, the first threshold and the second threshold are acquired by the terminal from the polling instruction, or the first threshold and the second threshold are determined by the terminal according to the cell broadcast information sent by the base station and cell resource utilization.

20. The terminal according to claim 19, wherein after the processor determines not to initiate the registration, the sender is further arranged to:

send a feedback message to the base station on a feedback resource indicated by the polling instruction, wherein the feedback message comprises indication information about that the terminal does not perform the registration, as well as comprising the characteristic value of the first judgment basis, the characteristic value of the second judgment basis, the characteristic value of the third judgment basis and the characteristic value of the fourth judgment basis.

21. The terminal according to claim 11, wherein the receiver is arranged to receive a polling instruction from each of multiple base stations; and the processor is further arranged to: calculate a transmission path loss between the terminal and each of the multiple base stations; and select one base station from the multiple base stations according to the transmission path loss between the terminal and each of the multiple base stations;

or, the receiver is further arranged to receive authentication indication information forwarded by the base station, wherein the authentication indication information is received by the base station from network equipment; the processor is further arranged to be subjected to authentication verification from the network equipment according to the authentication indication information; the sender is further arranged to send a terminal identity and business registration information to the base station, the business registration information comprising a business type and service subscription information; the receiver is further arranged to receive information of a time-frequency reporting resource from the base station; and the sender is further arranged to send an uplink data packet to the base station on the time-frequency reporting resource.

22. A base station, comprising: a sender and a receiver coupled with the sender through a bus system; wherein the sender, arranged to send a polling instruction to a terminal to enable the terminal to perform registration on a first access resource indicated by the polling instruction; and the receiver, arranged to receive registration information from the terminal, the registration information comprising an identification (ID) of the terminal and a type of the terminal, and the type of the terminal comprising at least one of information about speed of the terminal or transmit power of the terminal.

23. The base station according to claim 22, wherein the sender is further arranged to:

send cell broadcast information through broadcast on a dedicated frequency where no data is born by adopting transmitted power not lower than a preset value, the cell broadcast information comprising at least one of: a sending location of the polling instruction to enable the terminal to receive the polling instruction at the sending location, a cell Identification (ID), a cell frequency point, a cell frequency bandwidth, an antenna amount, a cell transmission environment type, a System Frame Number (SFN), a cell resource utilization rate, and transmitted power of the base station.

* * * * *

UNITED STATES PATENT AND TRADEMARK OFFICE
CERTIFICATE OF CORRECTION

PATENT NO. : 10,952,138 B2  
APPLICATION NO. : 16/565893  
DATED : March 16, 2021  
INVENTOR(S) : Hai Tang and Yuanqing Zeng Page 1 of 1

It is certified that error appears in the above-identified patent and that said Letters Patent is hereby corrected as shown below:

On the Title Page

Item (73) Assignee:  
GUANGONG OPPO MOBILE TELECOMMUNICATIONS CORP., LTD., Guangdong (CN)

Is changed to:  
GUANGDONG OPPO MOBILE TELECOMMUNICATIONS CORP., LTD., Dongguang, Guangdong (CN)

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*